US008260255B2

(12) United States Patent
Cai et al.

(10) Patent No.: US 8,260,255 B2
(45) Date of Patent: Sep. 4, 2012

(54) METHOD OF CONFIGURING AN ADAPTIVE MODULE FOR AN OFFLINE CHARGING SYSTEM

(75) Inventors: Yigang Cai, Naperville, IL (US); Chun Guang Xu, Beijing (CN); Sheng Chen, Beijing (CN); Hong Wei Sun, Beijing (CN)

(73) Assignee: Alcatel Lucent, Paris (FR)

( * ) Notice: Subject to any disclaimer, the term of this patent is extended or adjusted under 35 U.S.C. 154(b) by 1156 days.

(21) Appl. No.: 11/798,701

(22) Filed: May 16, 2007

(65) Prior Publication Data

US 2008/0182549 A1 Jul. 31, 2008

(30) Foreign Application Priority Data

Jan. 30, 2007 (CN) .......................... 2007 1 0004776

(51) Int. Cl.
*H04M 11/00* (2006.01)
(52) U.S. Cl. ... 455/406; 455/407; 455/408; 379/114.03; 379/115.01
(58) Field of Classification Search .......... 455/406–408, 455/418–420; 379/114.03, 115.01, 121.01, 379/126
See application file for complete search history.

(56) References Cited

U.S. PATENT DOCUMENTS

| | | | |
|---|---|---|---|
| 6,785,535 B2 * | 8/2004 | Lucidarme et al. ........... | 455/406 |
| 2003/0133552 A1 * | 7/2003 | Pillai et al. .................. | 379/114.2 |
| 2004/0132427 A1 * | 7/2004 | Lee et al. ...................... | 455/406 |
| 2005/0009500 A1 * | 1/2005 | Ear .............................. | 455/408 |
| 2006/0050711 A1 * | 3/2006 | Lialiamou et al. ......... | 370/395.2 |
| 2007/0033274 A1 * | 2/2007 | Duan ........................... | 709/223 |
| 2007/0036311 A1 * | 2/2007 | Foll et al. .................. | 379/114.28 |
| 2007/0123213 A1 * | 5/2007 | Wu .............................. | 455/406 |
| 2007/0243876 A1 * | 10/2007 | Duan ........................... | 455/445 |
| 2008/0147524 A1 * | 6/2008 | Connelly ...................... | 705/30 |
| 2008/0195535 A1 * | 8/2008 | Liu ................................ | 705/39 |

OTHER PUBLICATIONS

3GPP TS 32.297 V6.2.0 (Sep. 2006), Technical Specification, 3rd Generation Partnership Project; Technical Specification Group Service and System Aspects; Telecommunication management; Charging management; Charging Data Record (CDR) file format and transfer; (Release 6).*
Chinese Office Action dated May 16, 2011, issued for Application No. 2007-100047760 and English translation thereof.

* cited by examiner

*Primary Examiner* — Jinsong Hu
*Assistant Examiner* — Nathan Taylor
(74) *Attorney, Agent, or Firm* — Harness, Dickey & Pierce, P.L.C.

(57) ABSTRACT

In an example method of configuring an adaptive module for an offline charging system, a selection is received which selects one of a plurality of charging functions. In an example, the selection is received in response to a user prompt. In another example, the plurality of charging functions includes a charging data function (CDF), a charging gateway function (CGF), an integrated CDF/CGF without Ga interface support and an integrated CDF/CGF with Ga interface support. An adaptive module is configured to conform with the selected charging function. The adaptive module has the capacity to conform to any one of the plurality of charging functions. For example, the adaptive module includes a number of program modules and the configuring step selects which of the program modules are enabled and an order in which the enabled program modules are to be executed. The configured adaptive module is executed at a physical entity (e.g., a CDF, a CGF, etc.) within the offline charging system.

17 Claims, 12 Drawing Sheets

METHOD OF CONFIGURING AN ADAPTIVE MODULE FOR AN OFFLINE CHARGING SYSTEM

PRIORITY STATEMENT

This application claims priority under 35 U.S.C. §119 to Chinese Patent Application No. 200710004776.0, filed on Jan. 30, 2007, in the Chinese Patent Office (CPO), the disclosure of which is incorporated herein in its entirety by reference.

BACKGROUND OF THE INVENTION

1. Field of the Invention

Example embodiments of the present invention are related generally to a method of configuring an adaptive module for an offline charging system.

2. Description of the Related Art

Communication devices (e.g., wireless communication devices, wired communication devices, etc.) may be provisioned services which are associated with a certain fee or charge. The service provisioning is monitored and reported to a billing domain for the service provider in order to charge or bill the requesting communication device. The charging may be "online" in the sense that the billing is performed at the same time as the service being rendered, which may also be referred to as "real-time" charging. Alternatively, the charging may be "offline" in the sense that the billing is separate from the service provisioning. For example, offline charging may include storing charging information and periodically uploading the stored charging information, such as at a monthly billing invoice. Online charging, which may be reported over an Ro interface to a network (e.g., a different interface may be used in 1 G and 2 G networks], may directly affect the service provisioning in real-time (e.g., if a cell phone user exceeds his/her time limit, the call may be ended, etc.). In contrast, offline charging does not necessarily affect the service provisioning in "real-time".

Figure 1:
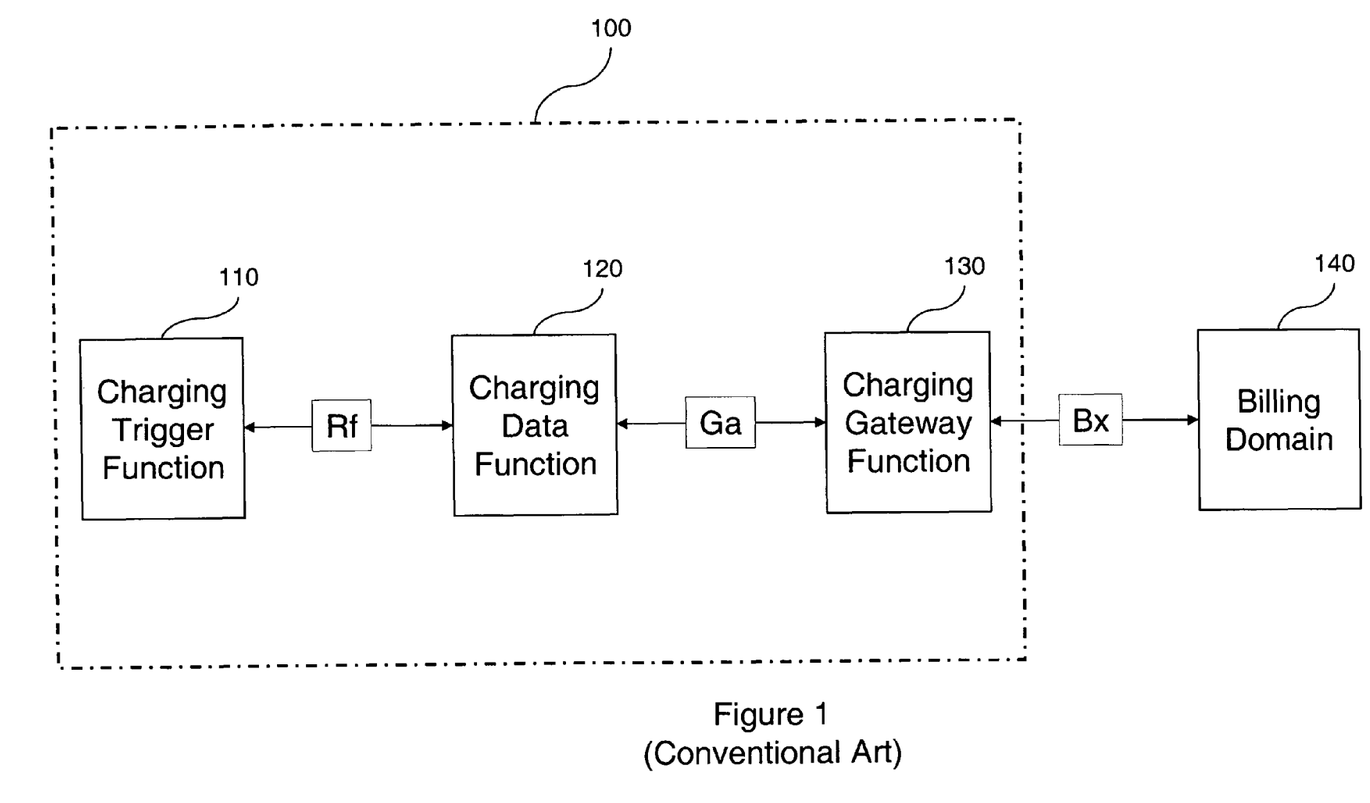
FIG. 1 illustrates a block diagram of a conventional offline charging architecture in accordance with the 3 GPP Release 6 standards.

3 GPP Release 6 standards define an offline charging system to provide charging services. FIG. 1 illustrates a block diagram of a conventional offline charging architecture in accordance with the 3 GPP Release 6 standards.

Referring to FIG. 1, the offline charging architecture includes an offline charging network 100, which is connected to a billing domain (BD) 140 via an interface Bx. The offline charging network 100 includes a charging trigger function (CTF) 110, a charging data function (CDF) 120 and a charging gateway function (CGF) 130. The billing domain 140 may correspond to a billing system and/or a billing mediation device.

While not illustrated in FIG. 1, it is understood that the CTF 110 is an integrated component (e.g., a software component) within each "network element" (NE) of the offline charging network 100. As used herein, a network element is any network physical entity or function entity within the offline charging network 100 (e.g., Call Session Control Function (CSCF), Application Server (AS), Multimedia Resource Control Function (MRFC), Gateway GPRS Support Node (GGSN), etc.) that may provide charging data to enable the CDF 120 to generate a charging data record (CDR), as will be described in greater detail below. For example, the network element may correspond to a serving call session control function (S-CSCF), a proxy-CSCF (P-CSCF), an interrogating-CSCF (ICSCF), a breakout gateway control function (BGCF), a media gateway control function (MGCF), an application server (AS), etc.

The CTF 110 generates charging events by monitoring network resource usage. The CTF 110 receives information from its network element. This information includes, but is not limited to, charging information relating to the services provided by the network element within which the CTF 110 is located. The CTF 110 is the focal point for collecting the charging information pertaining to charging events and charging sessions related to the network element. The CTF 110 assembles this charging information into charging sessions and charging events, and sends the charging sessions and charging events to the CDF 120. Charging sessions and charging events are well-known in the art. Generally, the CTF 110 includes an accounting metrics collection function and an accounting data forwarding function.

The CDF 120 receives the charging sessions and charging events from the CTF 110 via an Rf interface. The Rf interface is a "diameter reference point", and functions as an interface between one or more network elements within the offline charging network 100 and the CDF 120. Typically, the network elements within the offline charging network 100 send Accounting Record (ACR) messages (e.g., start, interim, stop, event, etc.) to the CDF 120 for offline charging. The CDF 120 responds to the messages received from a given network element with an acknowledgement (e.g., an accounting answer (ACA) response). The CDF 120 uses the information contained in the ACR messages (e.g., relating to charging sessions and charging events) to construct and/or modify Charging Data Records (CDRs). The CDF 120 then transfers the CDRs to at least one CGF 130 via an interface Ga. The interface Ga is a physical interface between the CDF 120 and the CGF 130. Generally, the Ga interface is used to transfer CDRs generated or modified in the CDF 120 to the CGF 130.

The CGF 130 acts as a gateway between the offline charging network 100 and the BD 140. The CGF 130 uses a Bx interface to transfer CDRs to the BD 140. Generally, CDR files are transferred from the CGF 130 within the offline charging network 100 to the BD 140 on the Bx interface in accordance with well-known protocols, such as File Transfer Protocol (FTP), secure FTP (SFTP), etc. Upon receiving the CDR files, at the BD 140, from the CGF 130 on the Bx interface, the BD 140 processes the CDRs to generate subscriber bills.

In session based charging, the CDF 120 opens a CDR when an initial charging event (i.e., an event specifying the start of a charging session) is received. The CDF 120 adds information to an opened CDR in response to receiving interim charging events, which may occur during a charging session. The CDF 120 may then close a CDR for a variety of reasons. The closing of the CDR may be based on the configuration on the CDF 120. For example, the CDF 120 may close a CDR based on one or more of the following: a CDR time limit; a CDR volume limit; a limit of change on charging conditions; an end of user session (i.e., reception of the final charging event describing the charging session termination); and implementation limits (e.g. memory size).

If the CDF 120 closes a CDR, but the charging session remains active, a subsequent CDR is opened. Hence multiple "partial CDRs" may be needed to completely describe the charging session for charging purposes. As such, the opening and closure of CDRs may occur asynchronously to the reception of the charging events.

The following two formats of partial CDRs are generally described in the 3 GPP Release 6 standards. The first format is referred to as a Fully Qualified Partial CDR (FQPC) and is a partial CDR that contains a complete set of CDR Fields. The second format is referred to as a Reduced Partial CDR (RPC) and is a reduced format partial CDR that contains the Mandatory fields (M) as well as changes occurring in any other field relative to the previous partial CDR.

The 3 GPP Release 6 standard defines a high-level functionality for the CDF 120 and the CGF 130. The 3 GPP Release 6 standard also defines a high-level functionality for an "integrated" CDF/CGF (e.g., see FIG. 3) which performs both CDF and CGF functions, but cannot perform exclusive CDF or exclusive CGF functions. In order to implement and maintain the CDF 120, the CGF 130 and/or the integrated CDF/CGF, a design team typically develops an application module specific to the particular function to be implemented. Accordingly, if the design team is requested to provide application modules to a dedicated CDF functionality, a dedicated CGF functionality and a dedicated integrated CDF/CGF functionality, three separate application modules need to be developed and maintained. Hardware and software development and maintenance within such application modules is typically very expensive.

SUMMARY OF THE INVENTION

An example embodiment of the present invention is directed to a method of configuring an adaptive module for an offline charging system, including receiving a selection selecting one of a plurality of charging functions, configuring an adaptive module to conform with the selected charging function, the adaptive module having the capacity to conform to any one of the plurality of charging functions and executing the configured adaptive module at a physical entity within the offline charging system.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

In order to better understand the present invention, conventional charging data function (CDF) and charging gateway function (CGF) implementations will be described within offline charging systems. Then, adaptive CDF/CGF modules implemented within offline charging systems according to example embodiments of the present invention will be described.

Conventional "Dedicated" CDF and CGF System

Figure 2:
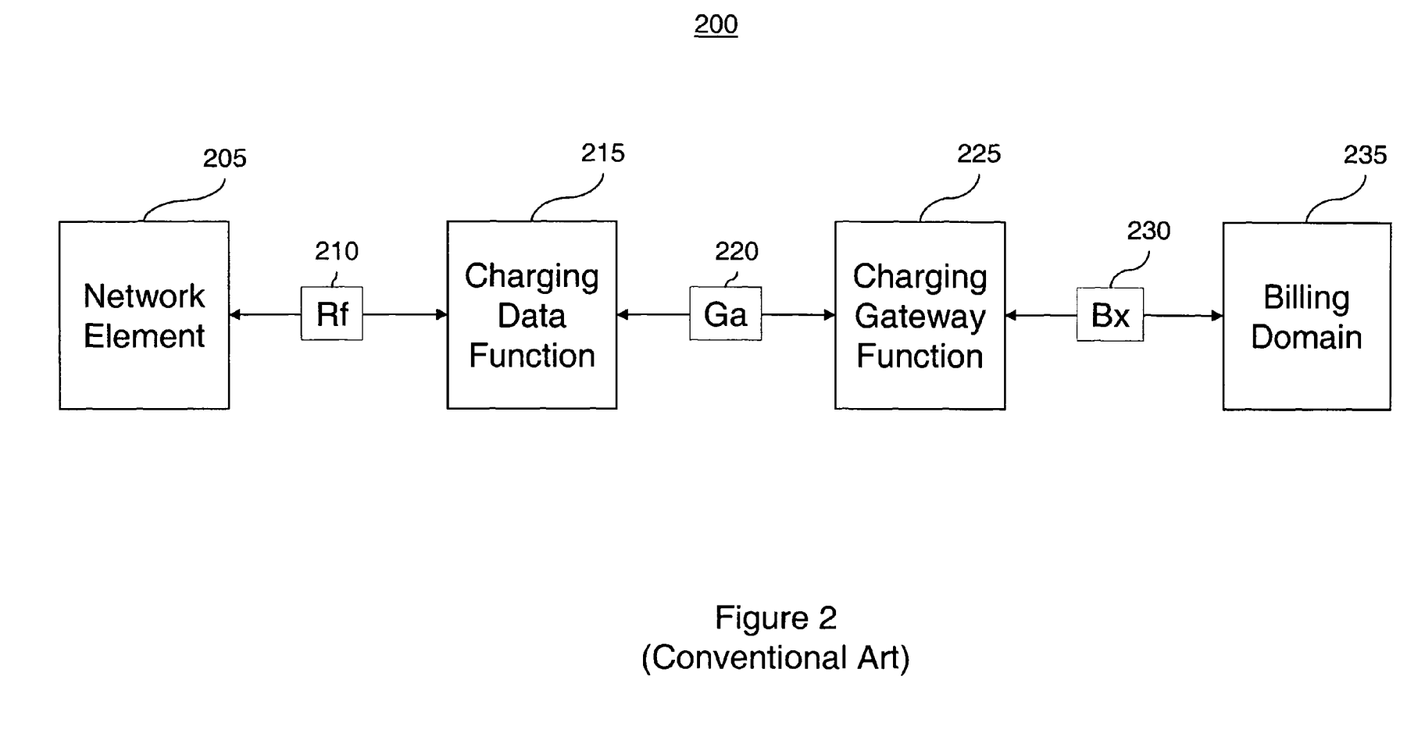
FIG. 2 illustrates a conventional offline charging system.

FIG. 2 illustrates a conventional offline charging system 200. The offline charging system 200 includes a network element (NE) 205, an Rf interface 210, a CDF 215, a Ga interface 220, a CGF 225, a Bx interface 230 and a billing domain (BD) 235.

Referring to FIG. 2, the offline charging system 200 is a modification of the offline charging architecture illustrated in FIG. 1. Accordingly, the Rf interface 210, the Ga interface 220 and the Bx interface 230 correspond to the Rf interface, the Ga interface and the Bx interface described with respect to FIG. 1, and as such will not be described further for the sake of brevity. Likewise, the billing domain 235 corresponds to the billing domain 140 of FIG. 1.

Referring to FIG. 2, the CDF 215 and the CGF 225 are each "dedicated" modules. In other words, the CDF 215 and the CGF 225 are located in separate, physical elements within the offline charging network, and are connected by a physical Ga interface. In FIG. 2, the CGF 225 is configured to operate exclusively as a CGF, while the CDF 215 is configured to operate exclusively as a CDF (e.g., in contrast to the duel-functionality of an integrated CDF/CGF).

The network element 205 is representative of one of a plurality of network elements which may be included within an offline charging network, such as the offline charging network 100 of FIG. 1. The network element 205 includes a charging trigger function (CTF) (e.g., CTF 110 of FIG. 1) such that the network element 205 is capable of outputting information related to billing (e.g., in response to a charging "event", in response to an activated billing session, etc.) to the CDF 215 via the Rf interface such that the CDF 215 may generate a CDR, or numerous partial CDRs. The CDF 215 forwards the CDR(s) to the CGF 225 via the Ga interface. The CGF 225 formats the received CDR(s) for the billing domain 235 and forwards the formatted CDR(s) to the billing domain 235 via the Bx interface 230.

Conventional "Integrated" CDF/CGF System

Figure 3:
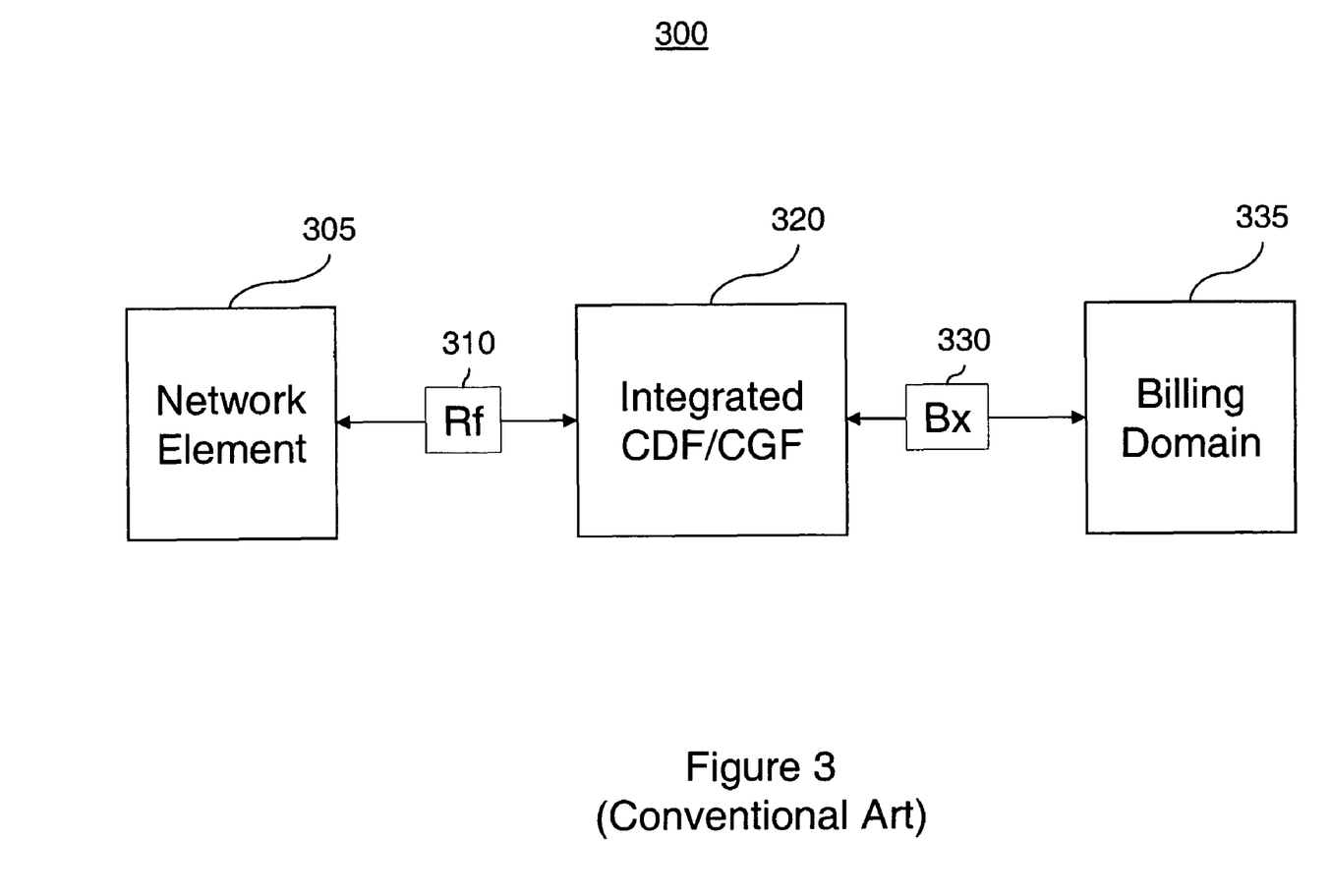
FIG. 3 illustrates another conventional offline charging system.

FIG. 3 illustrates a conventional offline charging system 300. The offline charging system 300 includes a network element (NE) 305, an Rf interface 310, an integrated CDF/CGF 320, a Bx interface 330 and a billing domain 335.

The offline charging system 300 of FIG. 3 is identical to the offline charging system 200 of FIG. 2 except that the functionality of the CDF 215, the Ga interface 220 and the CGF 225 has been consolidated within the integrated CDF/CGF 320. In FIG. 3, the integrated CDF/CGF 320 is "integrated" in the sense that software supporting the CDF and CGF is located within a single physical element. Further, the Ga interface 220 from FIG. 2 is not present within the offline charging system 300 of FIG. 3.

The Ga interface 220 from FIG. 2 is not implemented in the offline charging system 300 of FIG. 3 because a single software application may be deployed to perform the functionality of the integrated CDF/CGF 320. Accordingly, a Ga interface between the CDF and the CGF, which in FIG. 2 connects physically separated elements, need not be included because the CDF and CGF are executed at the same physical element.

As will be appreciated by one of ordinary skill in the art, the software applications which support the functionality of the CDF 215, the CGF 225 and the integrated CDF/CGF 320 are not interchangeable or substitutable. In other words, the CDF 215 can only be used as a dedicated CDF, the CGF 225 can only be used as a dedicated CGF and the integrated CDF/CGF 320 can only be used as an "integrated" CDF/CGF. Accordingly, in the conventional art, three separate programs need to be developed and maintained to support CDF and CGF offline charging in the systems 200 and 300 of FIGS. 2 and 3, respectively.

Example Adaptive CDF/CGF Module

As discussed above, conventionally, the CDF, the CGF and the integrated CDF/CGF perform their respective functions exclusively and are not "substitutable" or interchangeable. Example embodiments of the present invention directed to a process for implementing an "adaptive CDF/CGF module" will now be described.

The adaptive CDF/CGF module refers to a robust, customizable program module that may be deployed by a system engineer within an offline charging network (e.g., offline charging network 100 of FIG. 1) to act as one of (i) a CDF, (ii) a CGF, (iii) an integrated CDF/CGF and (iv) an integrated CDF/CGF with support for Ga interface. As will be discussed in greater detail below, the adaptive CDF/CGF module is more flexible than the separately implemented conventional modules in the sense that a system designer may deploy a single program module within the offline charging network and may readily customize the single program module to emulate the functionality of any one of (i) through (iv).

Figure 4A:
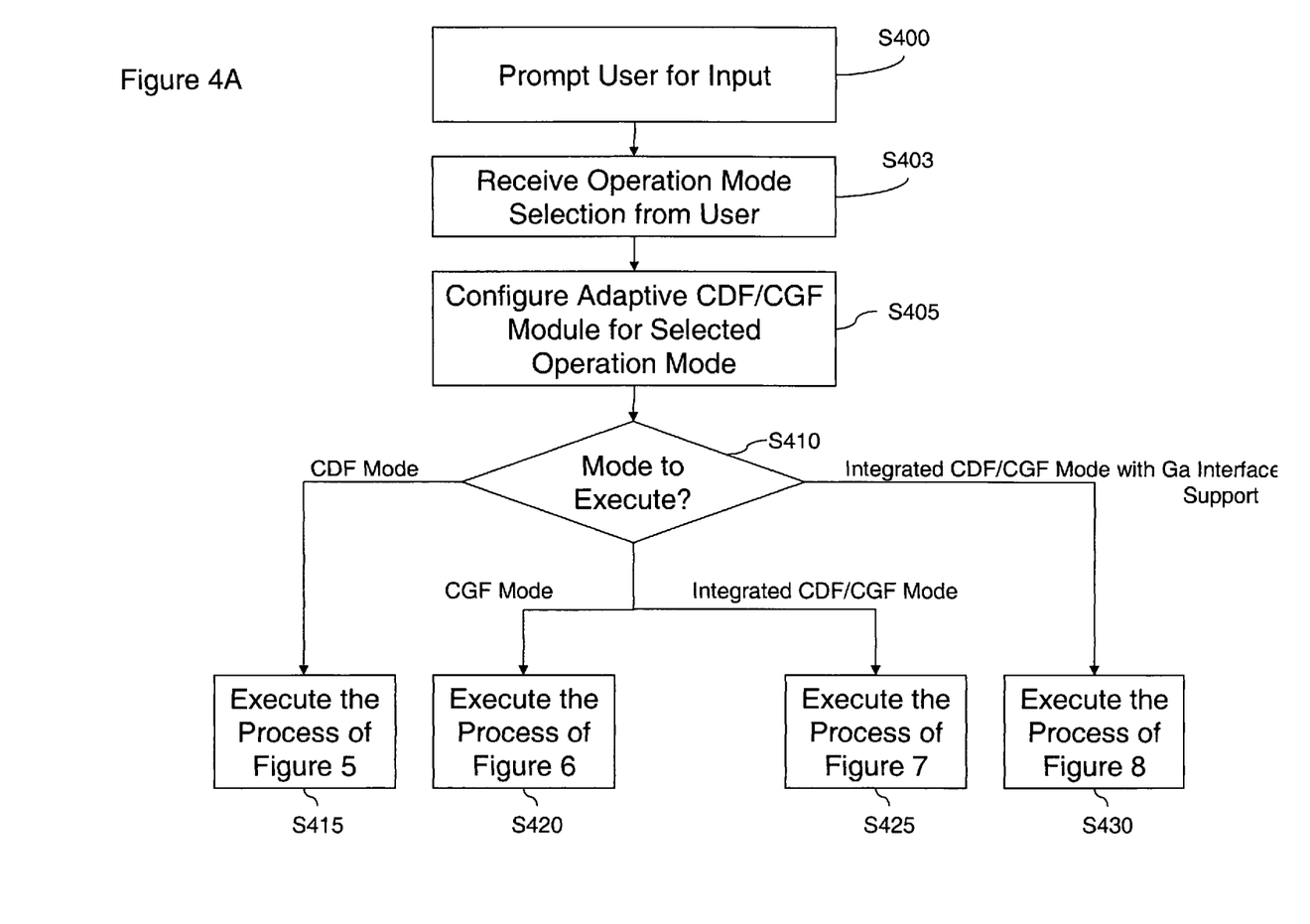
FIG. 4A illustrates a process for implementing an adaptive CDF/CGF module according to an example embodiment of the present invention.

FIG. 4A illustrates a process for implementing an adaptive CDF/CGF module according to an example embodiment of the present invention.

Figure 4B:
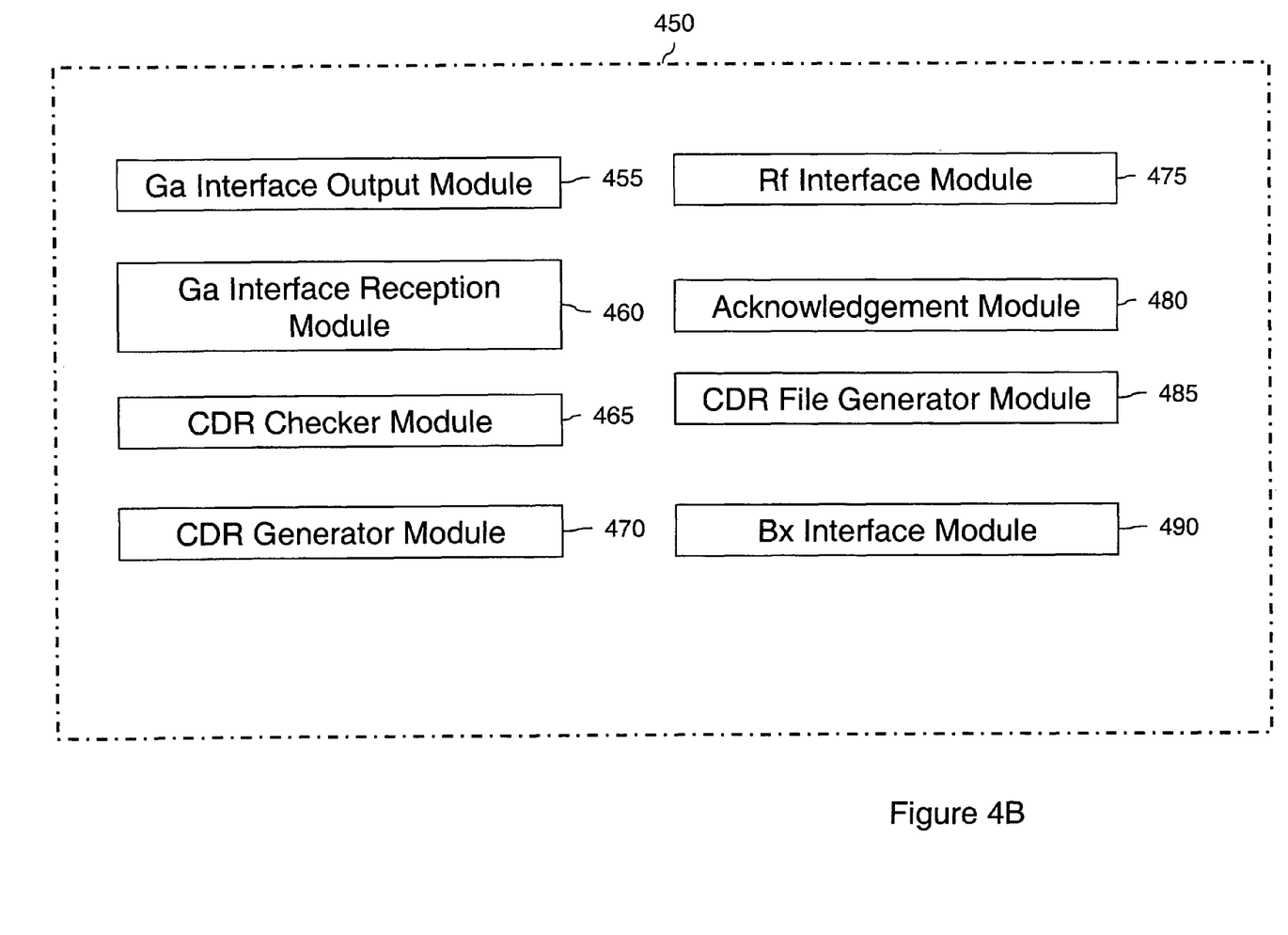
FIG. 4B illustrates an unconfigured adaptive CDF/CGF module according to an example embodiment of the present invention.

FIG. 4B illustrates an unconfigured adaptive CDF/CGF module 450 according to an example embodiment of the present invention.

As will be described below, the adaptive CDF/CGF module 450, once configured, is executed at an "adaptive CDF/CGF entity", which may be any physical entity conventionally corresponding to a CDF (e.g., CDF 215 of FIG. 2), a CGF (e.g., CGF 225 of FIG. 2) or an integrated CDF/CGF (e.g., integrated CDF/CGF 320 of FIG. 3).

In the example embodiment of FIG. 4A, in step S400, a user is prompted to select an operation mode for the adaptive CDF/CGF module 450. In an example, the user prompt may be implemented via a graphical user interface (GUI). After the user (e.g., a system designer) selects an operation mode for the adaptive CDF/CGF module, the selection is received (e.g., at the GUI or some other interface with the adaptive CDF/CGF module 450) in step S403. For example, if the adaptive CDF/CGF entity corresponds to a physical entity housing the CDF 215 of FIG. 2, the user or system designer selects a CDF operation mode. In another example, if the adaptive CDF/CGF entity corresponds to a physical entity housing the CGF 225 of FIG. 2, the user or system designer selects a CGF operation mode. In another example, if the adaptive CDF/CGF entity corresponds to a physical entity housing the integrated CDF/CGF 320 of FIG. 3, the user or system designer selects an integrated CDF/CGF operation mode.

In another example, in steps S400 and S403, the system designer has the ability to select an integrated CDF/CGF operation mode which maintains support for the Ga interface. As discussed above with respect to FIG. 3, the conventional integrated CDF/CGF 320 does not include a Ga interface because the integrated CDF/CGF 320 is located at a single physical entity, such that a Ga interface connecting the CDF and CGF need not be included. Maintaining a physical Ga interface between the CDF and CGF portions of the integrated CDF/CGF causes a performance issue. Thus, as will now be described, an internal API is substituted such that CDRs and CDR files can be "transported" or shared internally. For example, the CDF portion of the integrated CDF/CGF saves a CDR in a database which is shared with the CGF. The CGF retrieves CDR files from the shared database and may re-process and re-save the CDR files in the shared database until the CDR file is prepared to be sent to the billing domain.

In the example embodiment of FIG. 4A, in step S405, the system designer configures the adaptive CDF/CGF entity in accordance with the selected operation mode. In an example, the configuring step S405 is automated by a software program such that the system designer need only enter his/her selection into an interface (e.g., the GUI) in step S400 to launch the configuring step S405.

The configuring step S405 includes designating which features of the adaptive CDF/CGF module are to be activated. The adaptive CDF/CGF module may include a number of program modules. Based on which operation mode is selected in steps S400 and S403, the configuring step S405 may enable or disable certain of the program modules. For example, program modules associated exclusively with CGF are disabled if the selected operation mode is CDF, and vice versa. In another example, program modules associated with both CDF and CDF are enabled if the selected operation mode is the integrated CDF/CGF operation mode (e.g., with or without support for the Ga interface). The function-specific program module implementations are described below with respect to FIGS. 5 through 8.

Referring to the example embodiment of FIG. 4B, the adaptive CDF/CGF module 450 may include a Ga interface output module 455, a Ga interface reception module 460, a CDR checker module 465, a CDR generator module 470, an Rf interface module 475, an acknowledgment module 480, a CDR file generator module 485 and a Bx interface module 490. The configuring step S405 of FIG. 4A enables or disables certain of the program modules available within the adaptive CDF/CGF module 450 to "configure" the adaptive CDF/CGF module 450 to accommodate the user-requested charging function. Further, the configuring step S405 "links" or connects the enabled program modules such that the adaptive CDF/CGF module 450, once configured, executes the enabled program modules in a specified order. The configuring and linking of the configuring step S405 will become apparent from the description of the execution of each respective operation mode below with respect to FIGS. 5 through 8.

Further, certain program modules (e.g., the Rf interface module 475, the acknowledgment module 480, etc.) may be employed within differently configured charging functions. Thus, a coding efficiency is increased because entirely separate and independent programs need not be employed within the adaptive CDF/CGF module 450; rather, similar code functions may be "re-used" during different charging function implementations. For example, for the CDF and integrated CDF/CGF operation modes (e.g., described later with respect to FIGS. 5 and 7), the Rf interface module 475, the acknowledgment module 480 and the CDR generator module 470 are shared. In another example, for the CGF and integrated CDF/CGF operation mode with Ga interface support (e.g., described later with respect to FIGS. 6 and 8), the Ga interface reception module 460, the CDR checker module 470, the CDR file generator module 485 and the Bx interface module 490 are shared, and so on.

Next, in step S410, the configured adaptive CDF/CGF module is prepared for execution. If the adaptive CDF/CGF module 450 is configured for in a CDF operation mode, the process advances to step S415, and the adaptive CDF/CGF module 450 executes the process of FIG. 5. If the adaptive CDF/CGF module 450 is configured for in a CGF operation mode, the process advances to step S420, and the adaptive CDF/CGF module 450 executes the process of FIG. 6. If the adaptive CDF/CGF module 450 is configured for in an integrated CDF/CGF operation mode without Ga interface support, the process advances to step S425, and the adaptive CDF/CGF module 450 executes the process of FIG. 7. If the adaptive CDF/CGF module 450 is configured for in an integrated CDF/CGF operation mode with Ga interface support, the process advances to step S430, and the adaptive CDF/CGF module 450 executes the process of FIG. 8.

Example Executions of the Adaptive CDF/CGF Module

Figure 5:
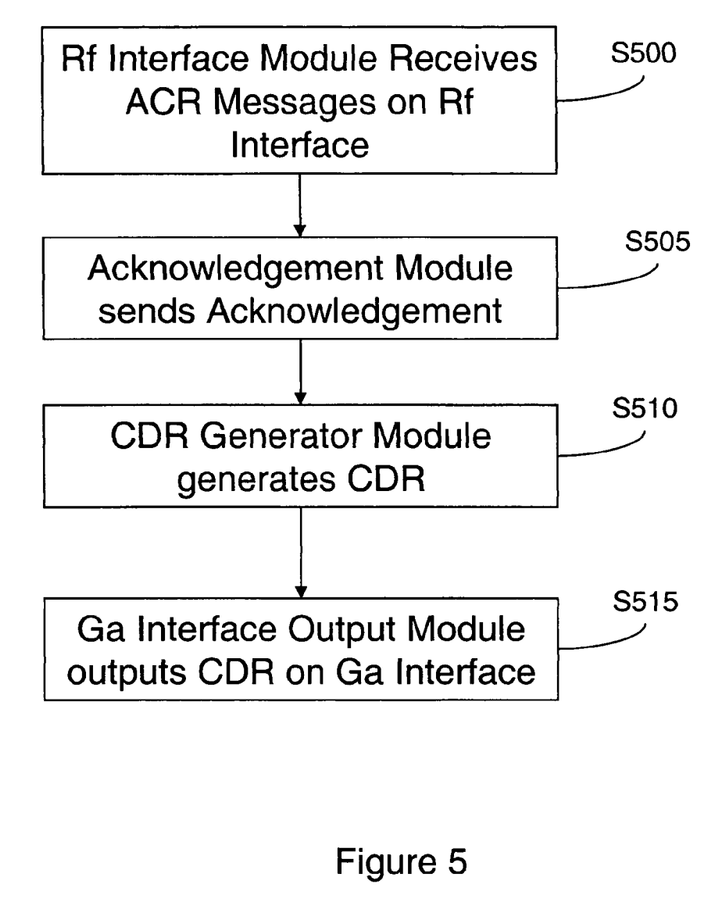
FIG. 5 illustrates an execution of the adaptive CDF/CGF module configured in a CDF operation mode according to another example embodiment of the present invention.

FIG. 5 illustrates an execution of the adaptive CDF/CGF module 450 configured in a CDF operation mode according to another example embodiment of the present invention.

In the example embodiment of FIG. 5, the execution of the adaptive CDF/CGF module may be similar to that of the conventional CDF 215 of FIG. 2. Accordingly, the Rf interface module 475 receives ACR messages (e.g., from a given network element) via the Rf interface in step S500. The ACR messages include accounting information relating to an attribute value pair (AVP) from one or more offline charging network elements (e.g., a serving call session control function (S-CSCF), a proxy-CSCF (P-CSCF), an interrogating-CSCF (ICSCF), a breakout gateway control function (BGCF), a media gateway control function (MGCF), an application server (AS), Gateway GPRS Support Node(GGSN), etc.). AVPs are parameter fields which carry charging information, such as calling and called party numbers, charging ID, etc.

Next, the acknowledgment module 480 acknowledges receipt of the ACR messages by transmitting one or more Accounting Answer (ACA) messages back to the sending network element(s) in step S505.

In step S510, the CDR generator module 470 evaluates the AVP associated with the received ACR to generate a CDR by mapping the AVP into a CDR field storage format, such as Abstract Syntax Notation 1 (ASN.1).

In step S515, the Ga interface output module 455 outputs the CDR (e.g., or a package of CDRs) on the Ga interface (e.g., to a corresponding CGF). For example, the outputting step S515 may be triggered upon receiving an ACR[stop] message and/or an ACR[event] message. The adaptive CDF/CGF module closes any partial CDRs designated by the triggering event and adds the closed partial CDRs to any stored CDRs designated by the triggering event to generate the "package" of CDRs.

Figure 6:
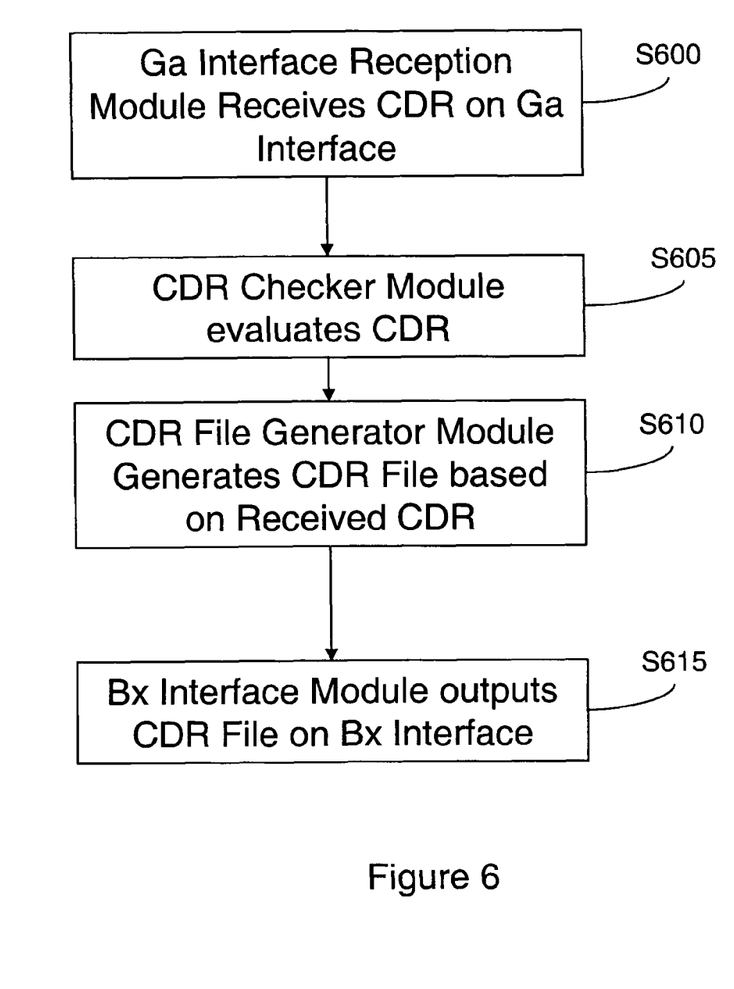
FIG. 6 illustrates an execution of the adaptive CDF/CGF module configured in a CGF operation mode according to another example embodiment of the present invention.

FIG. 6 illustrates an execution of the adaptive CDF/CGF module 450 configured in a CGF operation mode according to another example embodiment of the present invention.

In the example embodiment of FIG. 6, the execution of the adaptive CDF/CGF module may be similar to that of the conventional CGF 225 of FIG. 2. Accordingly, the Ga interface reception module 460 receives one or more CDRs from a CDF on the Ga interface in step S600. For example, the received CDR may correspond to the "package" of CDRs output at step S515 of FIG. 5. Accordingly, the CDF from which the CDR is received in step S600 may be another adaptive CDF/CGF module 450 configured to operate as a CDF in accordance with the process of FIG. 5.

In step S605, the CDR checker module 465 evaluates the received CDR to determine whether the received CDR is acceptable (e.g., whether the received CDR has a sufficient integrity). Next, in step S610, if the received CDR is determined to be acceptable, the CDR file generator module 485 generates a CDR file based on the received CDR. The received CDRs may be different from a vendor's CDF/CGF in an IMS domain, or alternatively from different domains such as service domain or bearer domain, which will result in different CDR formats, CDR fields, CDR headers, etc. As used herein, a "CDR file" refers to a CDR, or collection (e.g., "package") of CDRs, which has been formatted at the CGF for a particular billing domain.

Accordingly, to generate the CDR file, the CGF re-formats the received CDR in a way that service provider configured at the adaptive CDF/CGF module. Accordingly, the CDR files output from the CGF include uniform formatting. In step S615, the Bx interface module 490 outputs the generated CDR file on the Bx interface to a billing domain associated with the service being billed (e.g., the service associated with the CDR file).

Figure 7:
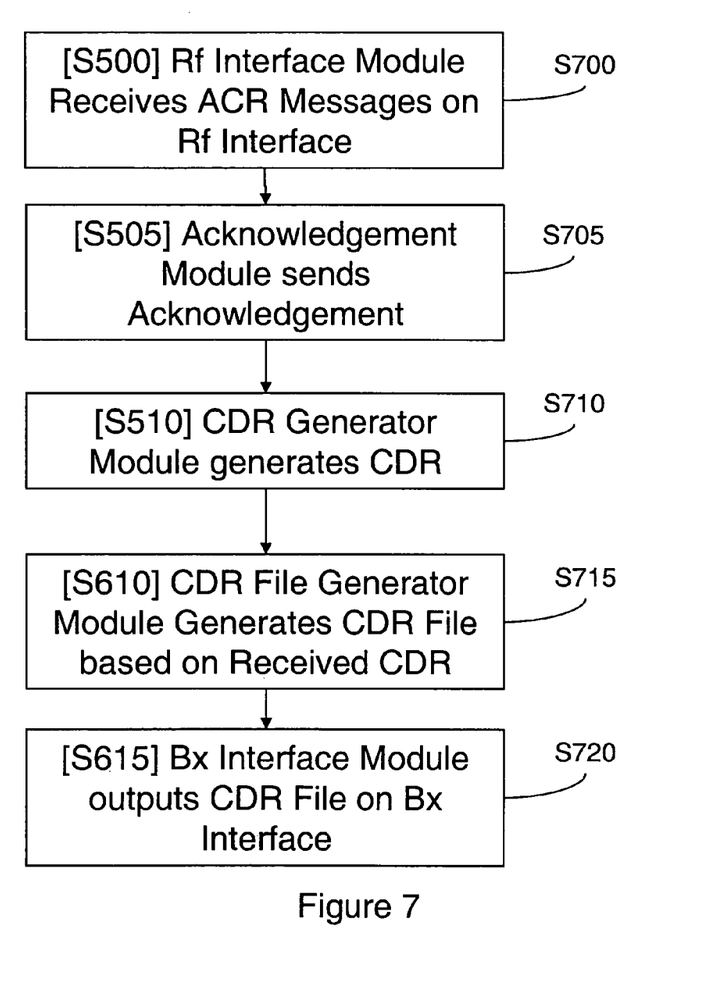
FIG. 7 illustrates an execution of the adaptive CDF/CGF module configured in an integrated CDF/CGF operation mode according to another example embodiment of the present invention.

FIG. 7 illustrates an execution of the adaptive CDF/CGF module 450 configured in an integrated CDF/CGF operation mode according to another example embodiment of the present invention.

In the example embodiment of FIG. 7, the execution of the adaptive CDF/CGF module 450 may be similar to that of the conventional integrated CDF/CGF 320 of FIG. 3. Accordingly, steps S700, S705 and S710 of FIG. 7 correspond to steps S500, S505 and S510, respectively, of FIG. 5. In step S700, the Rf interface module 475 receives ACR messages (e.g., from a given network element) via the Rf interface. Next, in step S705, the acknowledgment module 480 acknowledges receipt of the ACR messages by transmitting one or more Accounting Answer (ACA) messages back to the sending network element(s). In step S710, the CDR generator module 470 evaluates the AVP associated with the received ACR to generate a CDR by mapping the AVP into a CDR field storage format, such as Abstract Syntax Notation 1 (ASN.1).

In the example embodiment of FIG. 7, steps S715 and S720 correspond to steps S610 and S615, respectively, of FIG. 6. Accordingly, in step S715, the CDR file generator module 485 generates a CDR file based on the CDR (e.g., from step S710). In step S720, the Bx interface module 490 outputs the generated CDR file on the Bx interface to a billing domain associated with the service being billed (e.g., the service associated with the CDR file).

Figure 8:
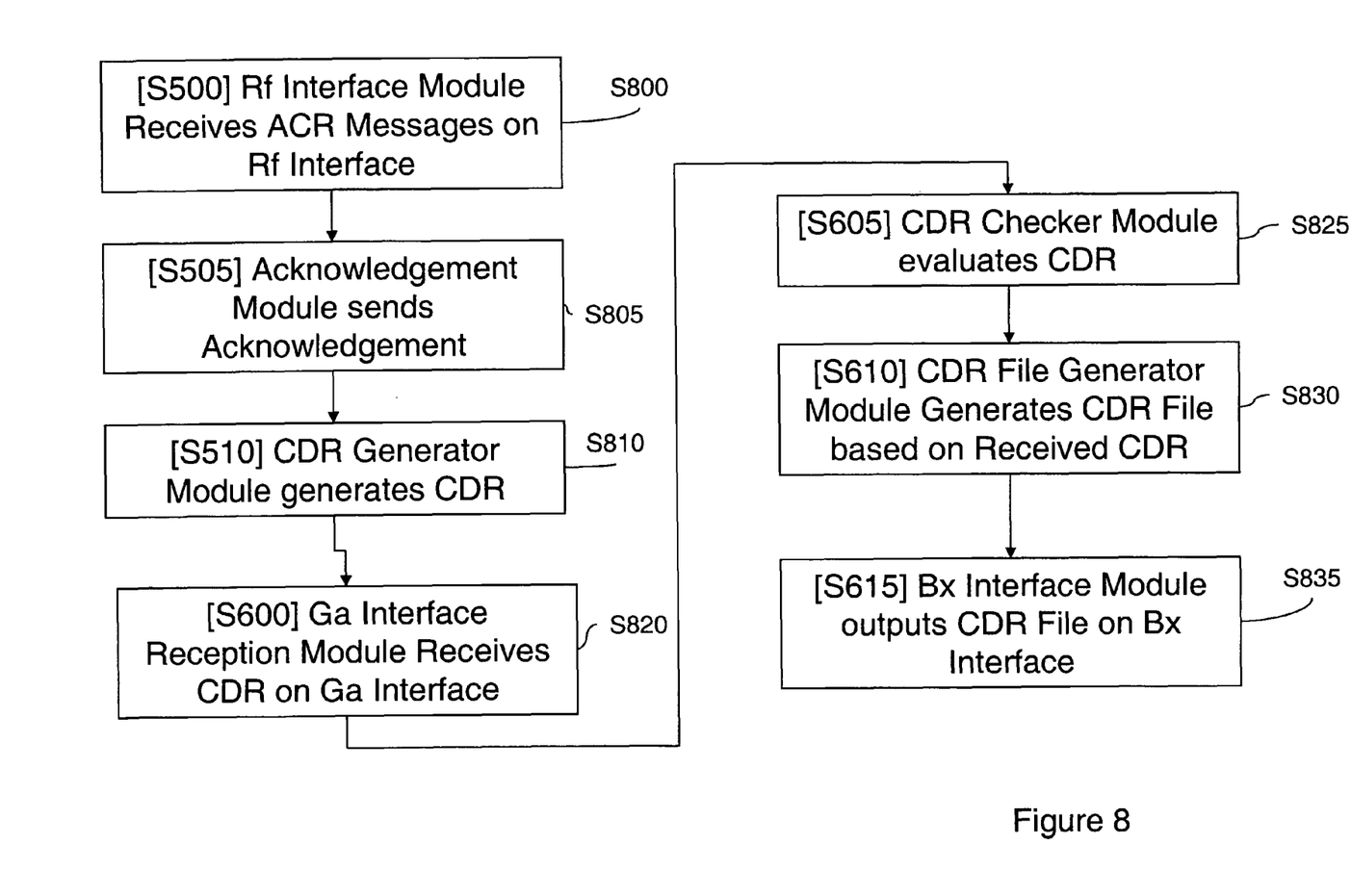
FIG. 8 illustrates an execution of the adaptive CDF/CGF module configured in an integrated CDF/CGF operation mode with Ga interface support according to another example embodiment of the present invention.

FIG. 8 illustrates an execution of the adaptive CDF/CGF module 450 configured in an integrated CDF/CGF operation mode with Ga interface support according to another example embodiment of the present invention.

The example embodiment of FIG. 8 is similar to the example embodiment of FIG. 7. For example, the example embodiments of FIGS. 7 and 8 each combine certain steps (or program modules) within the example embodiments of FIGS. 5 and 6. However, the example embodiment of FIG. 7 removes certain steps (or program modules) during the "combination"; namely, steps S515 of FIG. 5 (Ga interface output module 455) and steps S600 and S605 of FIG. 6 (Ga interface reception module 460 and CDR checker module 465). The process of FIG. 7 removes these steps (or program modules) because the process of FIG. 7 emulates the integrated CDF/CGF, which is located at a single physical entity, such that an interface between the CDF and CGF need not be included. In contrast, the example embodiment of FIG. 8 does not remove these steps, such that a "virtual" or internal Ga interface is provided.

In the example embodiment of FIG. 8, steps S800, S805 and S8 10 correspond to steps S500, S505 and S510, respectively, of FIG. 5. Accordingly, in step S800, the Rf interface module 475 receives ACR messages (e.g., from a given network element) via the Rf interface. Next, the acknowledgment module 480 acknowledges receipt of the ACR messages by transmitting one or more Accounting Answer (ACA) messages back to the sending network element(s) in step S805. In step S810, the CDR generator module 470 evaluates the AVP associated with the received ACR to generate a CDR by mapping the AVP into a CDR field storage format, such as Abstract Syntax Notation 1 (ASN.1).

In the example embodiment of FIG. 8, steps S820, S825, S830 and S835 correspond to steps S600, S605, S610 and S615, respectively, of FIG. 6. Accordingly, the Ga interface reception module 460 receives the CDR on the physical Ga interface in step S820. In other words, the generated package of CDR records is shared on a "virtual" or internal Ga interface (e.g., in response to a triggering event). Accordingly, the CDR(s) are not output in the sense that it is transmitted from the adaptive CDF/CGF entity to another entity, but rather the CDR package is routed to the Ga interface internally (e.g., within the adaptive CDF/CGF entity executing the adaptive CDF/CGF module).

In step S825, the CDR checker module 465 evaluates the received CDR to determine whether the received CDR is acceptable (e.g., whether the received CDR has a sufficient integrity). Next, in step S830, if the received CDR is determined to be acceptable, the CDR file generator module 485 generates a CDR file based on the received CDR. In step S835, the Bx interface module 490 outputs the generated CDR file on the Bx interface to a billing domain associated with the service being billed (e.g., the service associated with the CDR file).

Further, it is understood that the CGF provided by the integrated CDF/CGF may also receive CDRs from external entities, such as an external CDF or external CGF, SGSN/GGSN, etc., and is not limited to receiving files on the internal or "virtual" Ga interface. Accordingly, in step S800, two separate Ga interfaces are available: namely, an internal API or virtual Ga for internal CDF to internal CGF communication and a physical Ga interface for either internal CDF/CGF and/or for communication with external entities. It is understood that both types of Ga interfaces may be configured by the system engineer (e.g., see steps S400, S403 and S405 of FIG. 4).

Example Implementations of Adaptive CDF/CGF Module within Offline Charging Systems Examples of systems including the physical entities executing adaptive CDF/CGF module(s) 450, each having one of the example configurations described above with respect to FIGS. 5 through 8, will now be described in greater detail.

Figure 9:
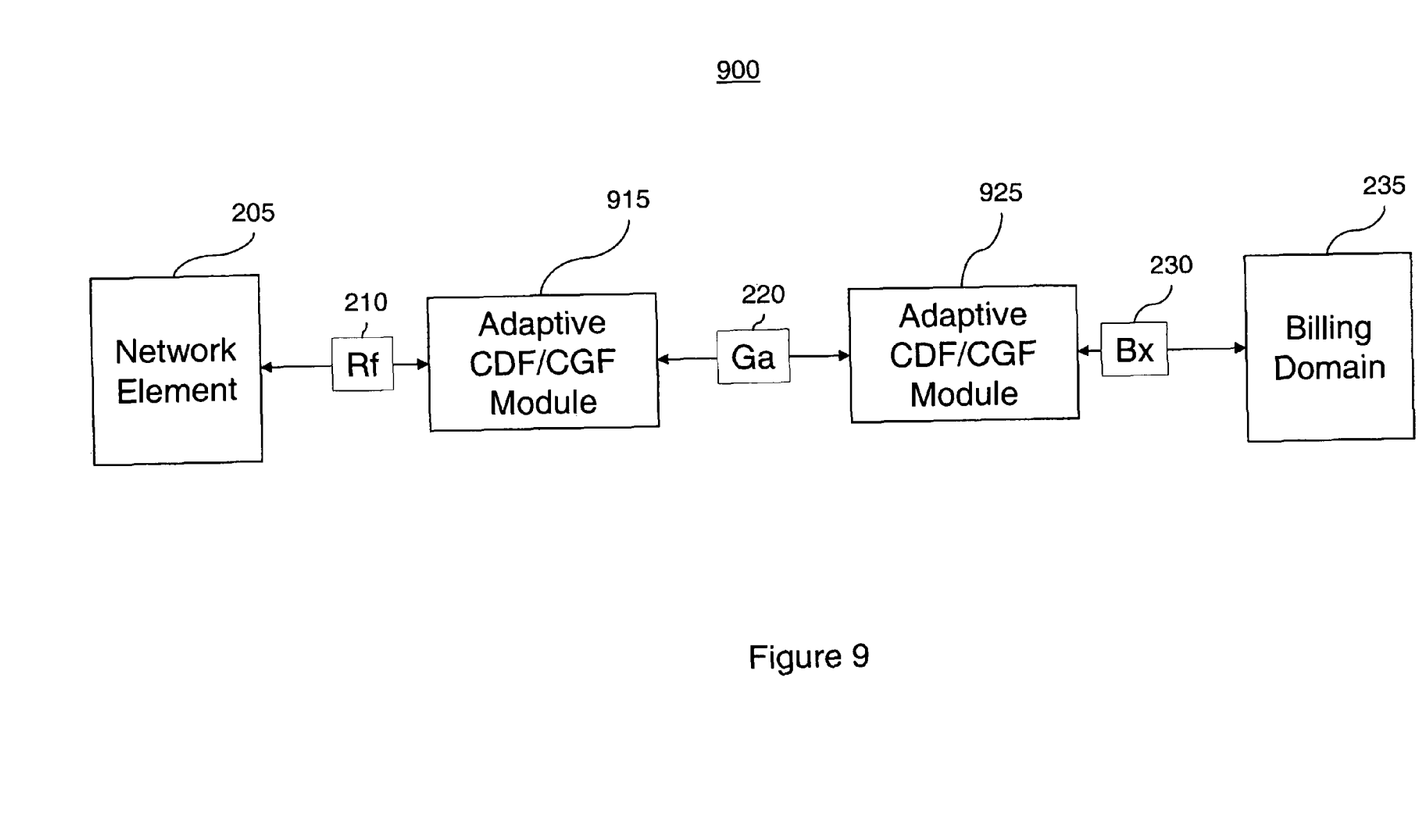
FIG. 9 illustrates an offline charging system according to an example embodiment of the present invention.

FIG. 9 illustrates an offline charging system 900 according to an example embodiment of the present invention. The offline charging system 900 of FIG. 9 is similar to the offline charging system 200 of FIG. 2. However, the offline charging system 900 includes first and second adaptive CDF/CGF modules 915 and 925 in place of the CDF 215 and CGF 225, respectively, of FIG. 2. The first adaptive CDF/CGF module 915 is configured for a CDF operation mode (e.g., see steps S400, S403 and S405 of FIG. 4). Accordingly, the first adaptive CDF/CGF module 915 operates consistent with the example process described above with respect to FIG. 5. The second adaptive CDF/CGF module 925 is configured for a CGF operation mode (e.g., see steps S400, S403 and S405 of FIG. 4). Accordingly, the second adaptive CDF/CGF module 925 operates consistent with the example process described above with respect to FIG. 6.

Figure 10:
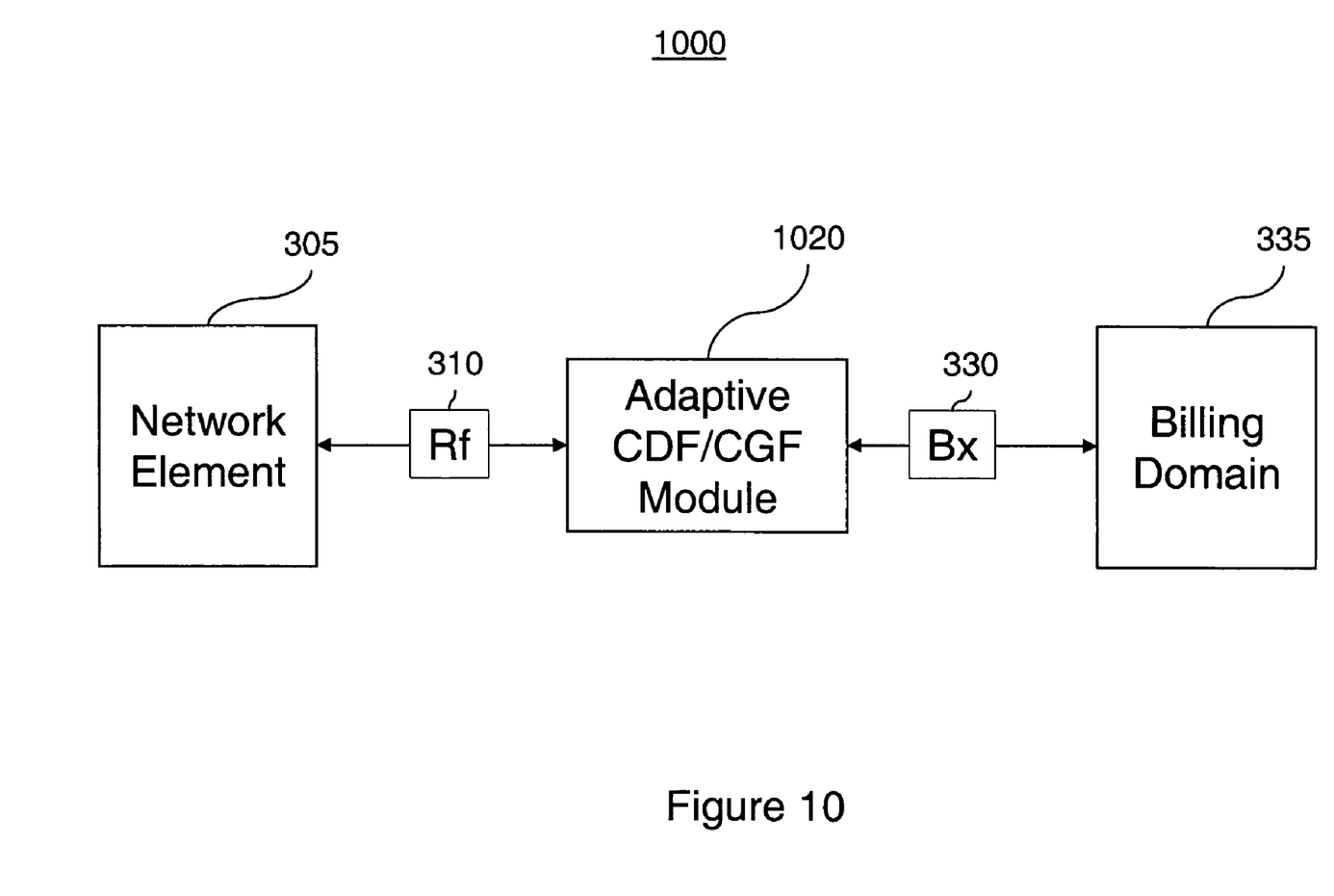
FIG. 10 illustrates an offline charging system according to another example embodiment of the present invention.

FIG. 10 illustrates an offline charging system 1000 according to another example embodiment of the present invention. The offline charging system 1000 of FIG. 10 is similar to the offline charging system 300 of FIG. 3. However, the offline charging system 1000 includes adaptive CDF/CGF module 1020 in place of the integrated CDF/CGF 320 of FIG. 3. The adaptive CDF/CGF module 1020 is configured for an integrated CDF/CGF operation mode without virtual Ga interface support (e.g., see steps S400, S403 and S405 of FIG. 4). Accordingly, the adaptive CDF/CGF module 1020 operates consistent with the example process described above with respect to FIG. 7 (e.g., without virtual Ga interface support).

Figure 11:
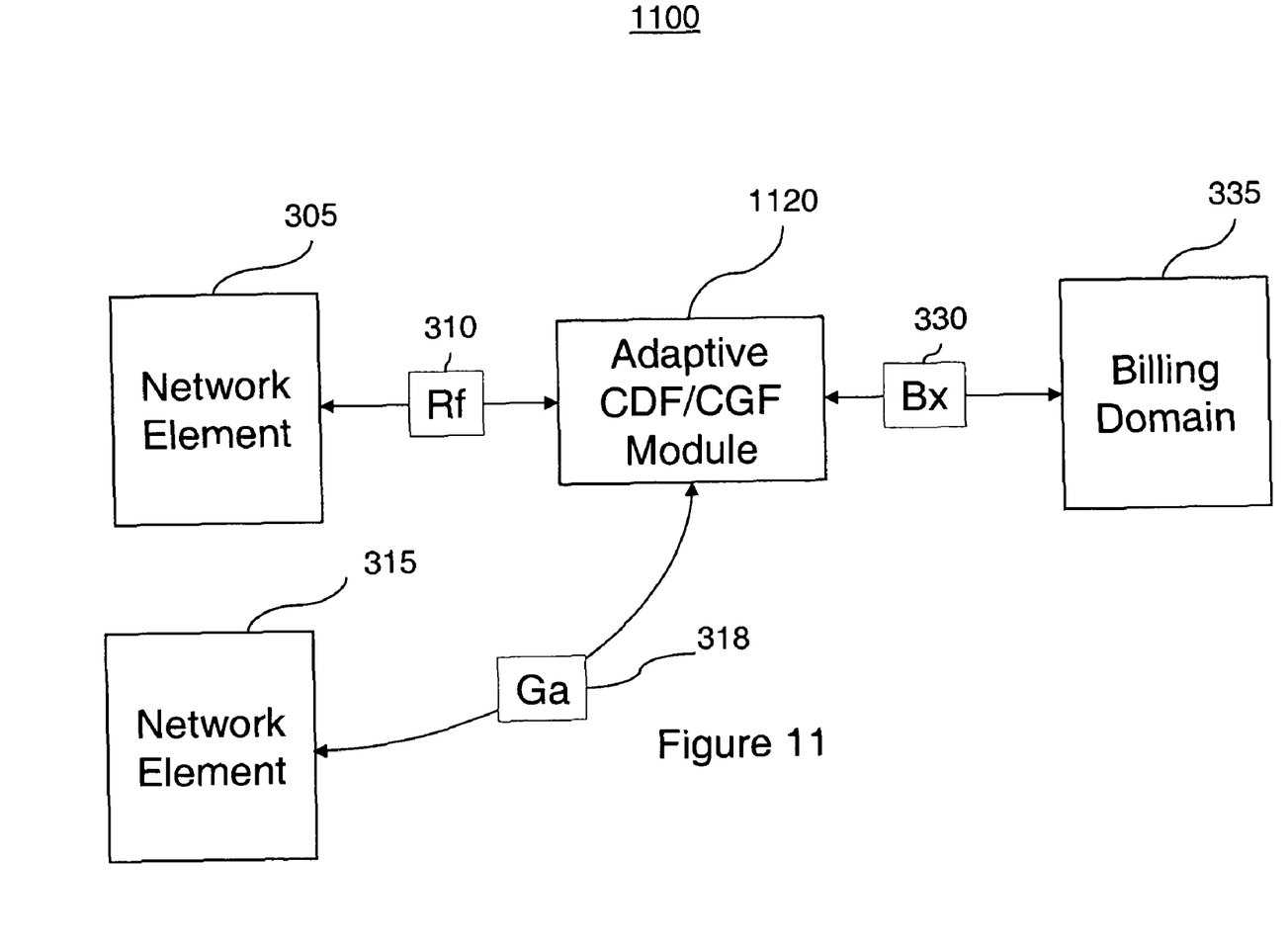
FIG. 11 illustrates an offline charging system according to another example embodiment of the present invention.

FIG. 11 illustrates an offline charging system 1100 according to another example embodiment of the present invention. The offline charging system 1100 of FIG. 11 is similar to the offline charging system 300 of FIG. 3, except that the offline charging system 1100 includes adaptive CDF/CGF module 1120 in place of the integrated CDF/CGF 320 of FIG. 3 and further includes an additional network element 315 connected to the adaptive CDF/CGF module 1120 via a Ga interface 318. The adaptive CDF/CGF module 1120 is configured for an integrated CDF/CGF operation mode supporting a virtual Ga interface (e.g., see steps S400 and S405 of FIG. 4). Accordingly, the adaptive CDF/CGF module 1120 operates consistent with the example process described above with respect to FIG. 8 (e.g., with a virtual Ga interface support). [Also this CGF functionality can receive CDR files from external entities via ga interface]

As will be appreciated from a review of the example embodiments of FIGS. 9, 10 and 11, the same core program may function as one of a CDF, a CGF, an integrated CDF/CGF and an integrated CDF/CGF with Ga interface support. Accordingly, a single program may be developed and maintained to provide the diverse functionality described above, instead of many separate programs, which decreases the development and maintenance costs associated with implementing offline charging networks. Further, as different of the charging functions (e.g., the CDF, CGF, integrated CDF/CGF, etc.) typically include at least some overlapping functionality, at least some of the same program modules may be "shared" or re-used for different of the charging functions, such that a coding or programming efficiency of the adaptive CDF/CGF module 450 is increased.

Example embodiments of the present invention being thus described, it will be obvious that the same may be varied in many ways. For example, while generally above-described with respect to an adaptive CDF/CGF module capable of performing one of a dedication CDF function, a dedicated CGF function, an integrated CDF/CGF function and an integrated CDF/CGF function with Ga interface support, it is understood that other example embodiments of the present invention may be directed to an adaptive CDF/CGF module capable of performing less than all of the above features, or alternatively more than the above-described features. In other words, the functionality described within the example adaptive CDF/CGF modules are neither an exclusive list nor a necessary list, but is rather provided for example purposes only.

Further, it is understood that the above-described offline charging networks and systems may be directed to any type of offline charging network, including but not limited to an offline bearer charging system, an offline Service charging network and/or an offline charging Internet Protocol Multimedia Subsystem (IMS) network.

Such variations are not to be regarded as a departure from the spirit and scope of the exemplary embodiments of the invention, and all such modifications as would be obvious to one skilled in the art are intended to be included within the scope of the invention.

What is claimed:

1. A method of configuring an adaptive module for an offline charging system, comprising:
   receiving a selection selecting one of a plurality of charging functions;
   configuring an adaptive module to conform with the selected charging function, the adaptive module having the capacity to conform to any one of the plurality of charging functions; and
   executing the configured adaptive module at a physical entity within the offline charging system,
   wherein the plurality of charging functions include a charging data function (CDF), a charging gateway function (CGF), an integrated CDF/CGF without Ga interface support and an integrated CDF/CGF with virtual and/or physical Ga interface support,
   wherein, if the selected charging function is an integrated CDF/CGF with support for a virtual and/or physical Ga interface, the configuring step enables a program module, the program module including a Rf interface module, an acknowledgment module, a charging data record (CDR) generator module, a Ga interface reception module, a CDR checker module, a CDR file generator module and a Bx interface module.

2. The method of claim 1, further comprising:
   prompting a user to make a selection of one of the plurality of charging functions,
   wherein the receiving step receives the selection from the user in response to the prompting step.

3. The method of claim 2, wherein the prompting step prompts the user via a graphical user interface (GUI).

4. The method of claim 1, wherein the CDF, CGF and the integrated CDF/CGF without Ga interface support are each associated with at least one of a plurality of program modules.

5. The method of claim 4, wherein the configuring step enables the at least one program module for the selected charging function.

6. The method of claim 5, wherein at least one same program module is enabled when different of the plurality of charging functions are selected.

7. The method of claim 5, wherein the configuring step enables a plurality of program modules and further links the enabled plurality of program modules in order to set an order in which the enabled plurality of program modules are executed during the execution step.

8. The method of claim 4, wherein the plurality of program modules include a Ga interface output module, the Ga interface reception module, the CDR checker module, the CDR generator module, the Rf interface module, the acknowledgment module, the CDR file generator module and the Bx interface module.

9. The method of claim 8, wherein the configuring step enables the at least one program module for the selected charging function.

10. The method of claim 9, wherein, if the selected charging function is a charging data function (CDF), the configuring step enables the Rf interface module, the acknowledgment module, the CDR generator module and the Ga interface output module.

11. The method of claim 9, wherein, during the executing step,
    the Rf interface module receives at least one Accounting Record (ACR) message on an Rf interface from one or more network elements, the at least one ACR associated with a given charging event or charging session;
    the acknowledgment module sends an acknowledgment of the ACR reception to the one or more network elements;
    the CDR generator module generates at least one CDR based on the at least one ACR; and
    the Ga interface output module outputs the at least one CDR on a Ga interface.

12. The method of claim 9, wherein, if the selected charging function is a charging gateway function (CGF), the configuring step enables the Ga interface reception module, the CDR checker module, the CDR file generator module and the Ga interface output module.

13. The method of claim 9, wherein, during the executing step,
    the Ga interface module receives a CDR from a CDF on a Ga interface;
    the CDR checker module determines whether the received CDR is acceptable;
    the CDR file generator generates a CDR file based at least in part on the received CDR if the received CDR is determined to be acceptable; and
    the Bx interface module outputs the CDR file on a Bx interface.

14. The method of claim 9, wherein, if the selected charging function is an integrated charging data function (CDF)/charging gateway function (CGF) without support for a virtual Ga interface, the configuring step enables the Rf interface module, the acknowledgment module, the CDR generator module, the CDR file generator module and the Bx interface module.

15. The method of claim 9, wherein, during the executing step,
    the Rf interface module receives at least one Accounting Record (ACR) message on an Rf interface from one or more network elements, the at least one ACR associated with a given charging event or charging session;
    the acknowledgment module sends an acknowledgment of the ACR reception to the one or more network elements;
    the CDR generator module generates at least one CDR based on the at least one ACR;
    the CDR file generator generates a CDR file based at least in part on the at least one CDR; and
    the Bx interface module outputs the CDR file on a Bx interface.

16. The method of claim 9, wherein, during the executing step,
    the Rf interface module receives at least one Accounting Record (ACR) message on an Rf interface from one or more network elements, the at least one ACR associated with a given charging event or charging session;
    the acknowledgment module sends an acknowledgment of the ACR reception to the one or more network elements;
    the CDR generator module generates at least one CDR based on the at least one ACR;

the Ga interface reception module retrieves the at least one CDR on a Ga interface;

the CDR checker module determines whether the retrieved CDR is acceptable;

the CDR file generator generates a CDR file based at least in part on the retrieved CDR if the retrieved CDR is determined to be acceptable; and the Bx interface module outputs the CDR file on a Bx interface.

17. The method of claim 1, wherein the offline charging system includes one of an offline bearer charging network, an offline service charging network and/or an offline charging Internet Protocol Multimedia Subsystem (IMS) network.

* * * * *